United States Patent
Ando (10) Patent No.: US 6,805,511 B2
(45) Date of Patent: Oct. 19, 2004

(54) BALL POINT PEN

(75) Inventor: Masashi Ando, Aichi (JP)

(73) Assignee: The Pilot Ink Co., Ltd., Aichi (JP)

( * ) Notice: Subject to any disclaimer, the term of this patent is extended or adjusted under 35 U.S.C. 154(b) by 0 days.

(21) Appl. No.: 10/689,731

(22) Filed: Oct. 22, 2003

(65) Prior Publication Data

US 2004/0170467 A1 Sep. 2, 2004

(51) Int. Cl.$^7$ ................................................. B43K 7/10
(52) U.S. Cl. ........................................ 401/214; 401/142
(58) Field of Search ................................ 401/141, 142, 401/214–216, 208, 209, 212

(56) References Cited

U.S. PATENT DOCUMENTS

| | | | |
|---|---|---|---|
| 4,653,950 A | * 3/1987 | Yoshida | 401/215 |
| 5,951,188 A | 9/1999 | Loftin | |
| 6,082,920 A | 7/2000 | Furukawa | |
| 6,602,011 B2 | * 8/2003 | Tanaka | 401/214 |

FOREIGN PATENT DOCUMENTS

| | | |
|---|---|---|
| EP | 0 787 779 A2 | 8/1997 |
| EP | 1 201 456 A1 | 5/2002 |
| JP | 2555677 Y2 | 8/1997 |
| WO | WO 97/16499 A1 | 5/1997 |
| WO | WO 98/04641 A1 | 2/1998 |

* cited by examiner

Primary Examiner—Gregory L. Huson
Assistant Examiner—Huyen Le
(74) Attorney, Agent, or Firm—Sughrue Mion, PLLC (57) ABSTRACT

Ink and an ink follower are reserved in an ink tube. An elastic member urges a ball forward. When an outflow of ink is measured at intervals of a writing distance of 100 m, the value of outflow of ink per writing distance of 100 m until a measurement time just before outflow of 80% of the amount of charged ink from the start of writing is selected to be in a range between a value smaller by 20 mg than the outflow of ink in the writing distance range of from 0 m to 100 m and a value larger by 20 mg than the outflow of ink in the writing distance range of from 0 m to 100 m.

7 Claims, 6 Drawing Sheets

BALL POINT PEN

BACKGROUND OF THE INVENTION

The present invention relates to a ball point pen having low-viscosity ink directly reserved in an ink tube, and an ink follower disposed at a rear end of the ink.

In the conventional art, as disclosed in JP-Y2-2555677 (Japanese Registered Utility Model Publication Number: 2555677), a ball point pen has a paste-like backflow preventing agent disposed in an ink tube charged with ink in front of the backflow preventing agent, a tip fixed to a front end of the ink tube while rotatably holding a ball partially protruding from a front end of the tip, and a spring for urging the ball to come into contact with an inward front end edge of the tip when the ball point pen is not used. Further, low-viscosity aqueous ink is charged in the ink tube.

In the conventional-art ball point pen, low-viscosity aqueous ink is charged. Accordingly, abundant ink outflow characteristic can be satisfied when writing starts. There is however the possibility that scratchiness may occur in writing at an early stage after the start of writing because ink outflow characteristic has a tendency to decrease gradually as the head of ink (i.e., water head pressure of ink applied on the pen point) decreases gradually after the start of writing.

To eliminate the scratchiness in writing, it may be conceived that the gap between the inner surface of the front end edge portion and the ball is formed largely in advance. In this case, there is however the possibility that blur may occur in writing because the outflow of ink is too much after the start of writing.

SUMMARY OF THE INVENTION

The present invention is developed to solve the problem in the conventional art and an object of the invention is to provide a ball point pen in which there is no possibility of occurrence of scratchiness and blur in writing until almost consumption of charged ink after the start of writing, even though low-viscosity ink is charged in the ball point pen.

The inventor has made eager examination to solve the problem. As a result, it has been found that occurrence of scratchiness and blur in writing can be suppressed when an outflow of ink (i.e., the amount of consumed ink) until almost consumption of charged ink after the start of writing is specified. The inventor has further paid attention to the fact that the decrement of the head of ink and the increase of the gap between the inner surface of the front end edge portion and the ball (i.e., abrasion of the ball seat) are intimately related to the outflow of ink. As a result, it has been found that the outflow of ink until almost consumption of charged ink after the start of writing can be kept in a proper range to suppress occurrence of scratchiness and blur in writing when the decrement of the head of ink and the increase of the gap between the inner surface of the front end edge portion and the ball are specified.

(1) That is, according to a first aspect, the invention provides a ball point pen 1 including: a tip body 2 including a front end edge portion 21 and a ball seat 22 provided inward at a front end, and a ball 3 rotatably held in the front end edge portion 21 and the ball seat 22; an ink tube 6 formed so that the tip body 2 is provided at a front end of the ink tube 6; ink 7 reserved in the ink tube 6; an ink follower 8 disposed at a rear end of the ink 7 and advancing with consumption of the ink 7; and an elastic member 4 for urging the ball 3 forward to bring the ball 3 into close contact with an inner surface of the front end edge portion 21 of the tip body 2, wherein the value of outflow of ink per writing distance of 100 m until a measurement time just before outflow of 80% of the amount of charged ink from the start of writing in the case where an outflow of ink is measured at intervals of a writing distance of 100 m is selected to be in a range between a value smaller by 20 mg than the outflow of ink in the writing distance range of from 0 m to 100 m and a value larger by 20 mg than the outflow of ink in the writing distance range of from 0 m to 100 m.

According to the first aspect, the outflow of ink until almost consumption of charged ink after the start of writing can be kept in a proper range to thereby suppress occurrence of scratchiness and blur in writing.

If the outflow of ink per writing distance of 100 m is smaller than a value smaller by 20 mg than the outflow of ink in the writing distance range of from 0 m to 100 m, there is the possibility that scratchiness may occur in writing because the outflow of ink decreases remarkably compared with that at the time of the start of writing. On the contrary, if the outflow of ink per writing distance of 100 m is larger than a value larger by 20 mg than the outflow of ink in the writing distance range of from 0 m to 100 m, there is the possibility that blur may occur in writing because the outflow of ink increases remarkably compared with that at the time of the start of writing.

The phrase "a measurement time just before outflow of 80% of the amount of charged ink from the start of writing in the case where an outflow of ink is measured at intervals of a writing distance of 100 m" is used for specifying the writing distance in the case where almost of charged ink is consumed.

The writing distance range in the case where almost of charged ink is consumed may be more preferably set "a measurement time just after outflow of 80% of the amount of charged ink from the start of writing in the case where an outflow of ink is measured at intervals of a writing distance of 100 m" in order to elongate the writing-enabled distance in which the outflow of ink can be kept in a proper range.

(2) Preferably, in a second aspect, in addition to the first aspect, in the ball point pen according to the invention, the decrement ΔH of the head of ink per writing distance of 100 m until a measurement time just before outflow of 80% of the amount of charged ink from the start of writing in the case where an outflow of ink is measured at intervals of a writing distance of 100m is selected to be in a range of from 3 mm to 12 mm.

According to the second aspect, occurrence of scratchiness and blur in writing can be surely prevented until almost of charged ink is consumed after the start of writing.

If the decrement ΔH of the ink head per writing distance of 100 m is smaller than 3 mm, there is the possibility that scratchiness may occur in writing easily because the outflow of ink from the front end of the tip body 2 is too little. On the contrary, if the decrement ΔH of the ink head per writing distance of 100 m is larger than 12 mm, there is the possibility that blur may occur in writing easily because the outflow of ink from the front end of the tip body 2 is too much.

The phrase "the decrement ΔH of the ink head per writing distance of 100 m" means an average of descending speed of the ink head due to writing in a time range of from the start of writing to a measurement time just before consumption of 80% of the amount of charged ink in the case where an outflow of ink is measured at intervals of a writing distance of 100 m. The term "ink head" used herein means a height (mm) of the rear end of ink from the pen point when the ball point pen is placed with the pen point down.

(3) Preferably, in a third aspect, in addition to the second aspect, in the ball point pen 1 according to the invention, the increment ΔC of longitudinal movable length C of the ball 3 at a front end of the tip body 2 per writing distance of 100 m until a measurement time just before outflow of 80% of the amount of charged ink from the start of writing in the case where an outflow of ink is measured at intervals of a writing distance of 100 m is selected to be in a range of from 0.1 μm (0.0001 mm) to 1.5 μm (0.0015 mm) (more preferably in a range of from 0.1 μm to 1.0 μm, further preferably in a range of from 0.1 μm to 0.5 μm).

According to (3), the outflow of ink can be more surely set in a proper range until almost of charged ink is consumed after the start of writing, so that occurrence of scratchiness and blur in writing can be prevented.

If the increment ΔC of longitudinal movable length C of the ball 3 at the front end of the tip body 2 per writing distance of 100 m is smaller than 0.1 μm, the outflow of ink cannot be kept constant because the increment of the gap between the ball 3 and the inner surface of the front end edge portion 21 due to writing is excessively small so that the outflow of ink decreases gradually according to writing with the decrement of the ink head due to writing.

On the contrary, if the increment ΔC of longitudinal movable length C of the ball 3 at the front end of the tip body 2 per writing distance of 100 m is larger than 1.5 μm, the outflow of ink cannot be kept constant because the increment of the gap between the ball 3 and the inner surface of the front end edge portion 21 due to writing is excessively large so that the outflow of ink increases gradually according to writing to overcome the function of decreasing the ink head due to writing.

That is, in the ball point pen 1 as in (3), the function of gradually decreasing the outflow of ink due to the descending of the ink head and the function of gradually increasing the outflow of ink due to the abrasion of the ball seat 22 are balanced with each other so that the outflow of ink can be kept approximately constant.

The phrase "the increment ΔC of longitudinal movable length C of the ball 3 at the front end of the tip body 2 per writing distance of 100 m" means an average of increasing speed of the gap between the ball 3 and the inner surface of the front end edge portion 21 (i.e., abrading speed of the ball seat 22 due to writing).

(4) Preferably, in a forth aspect, in addition to the afore mentioned aspects, in the ball point pen 1 according to the invention, the viscosity of the ink 7 at 20° C. is selected to be in a range of from 1 mPa.s to 50 mPa.s.

According to (4), because the viscosity of the ink 7 is low, ink follow-up characteristic is improved so that smooth writing can be made without scratchiness in writing even in the case where writing is made at a high speed.

(5) Preferably, in a fifth aspect, in addition to one of first to third aspects, in the ball point pen 1 according to the invention, the viscosity of the ink 7 measured at 20° C. at a rotational speed of 100 rpm by an E-type rotational viscometer is selected to be in a range of from 3 mpa.s to 160 mPa.s, and the shear-thinning index of the ink 7 is selected to be in a range of from 0.80 to 0.99.

According to (5), because the viscosity of the ink 7 is low, ink follow-up characteristic is improved so that smooth writing can be made without scratchiness in writing even in the case where writing is made at a high speed.

Incidentally, the shear-thinning index n is a value calculated according to an experimental equation $T=Kj^n$ (in which K is a constant calculated) derived by rheological measurement of shear stress (T) and shear rate (j) with a viscometer. Incidentally, specific examples of the E-type rotational viscometer include an EM-type rotational viscometer, an EL-type rotational viscometer, and an EH-type rotational viscometer.

Note that in the drawings, reference numeral 1 denotes a ball point pen, 2 a tip body, 21 a front end edge portion, 22 a inward protrusion (ball seat), 23 an ink flow gap, 24 a center hole, 3 a ball, 4 an elastic member, 41 a rod portion, 42 a coil portion, 43 a swollen portion, 5 a holder, 51 a lock protrusion, 6 an ink tube, 7 an ink, 8 an ink follower and 9 a tail plug.

DESCRIPTION OF THE PREFERRED EMBODIMENT

A mode for carrying out the invention will be described with reference to the drawings.

FIG. 1 to FIG. 5 show a first embodiment of the invention.

Figure 1:
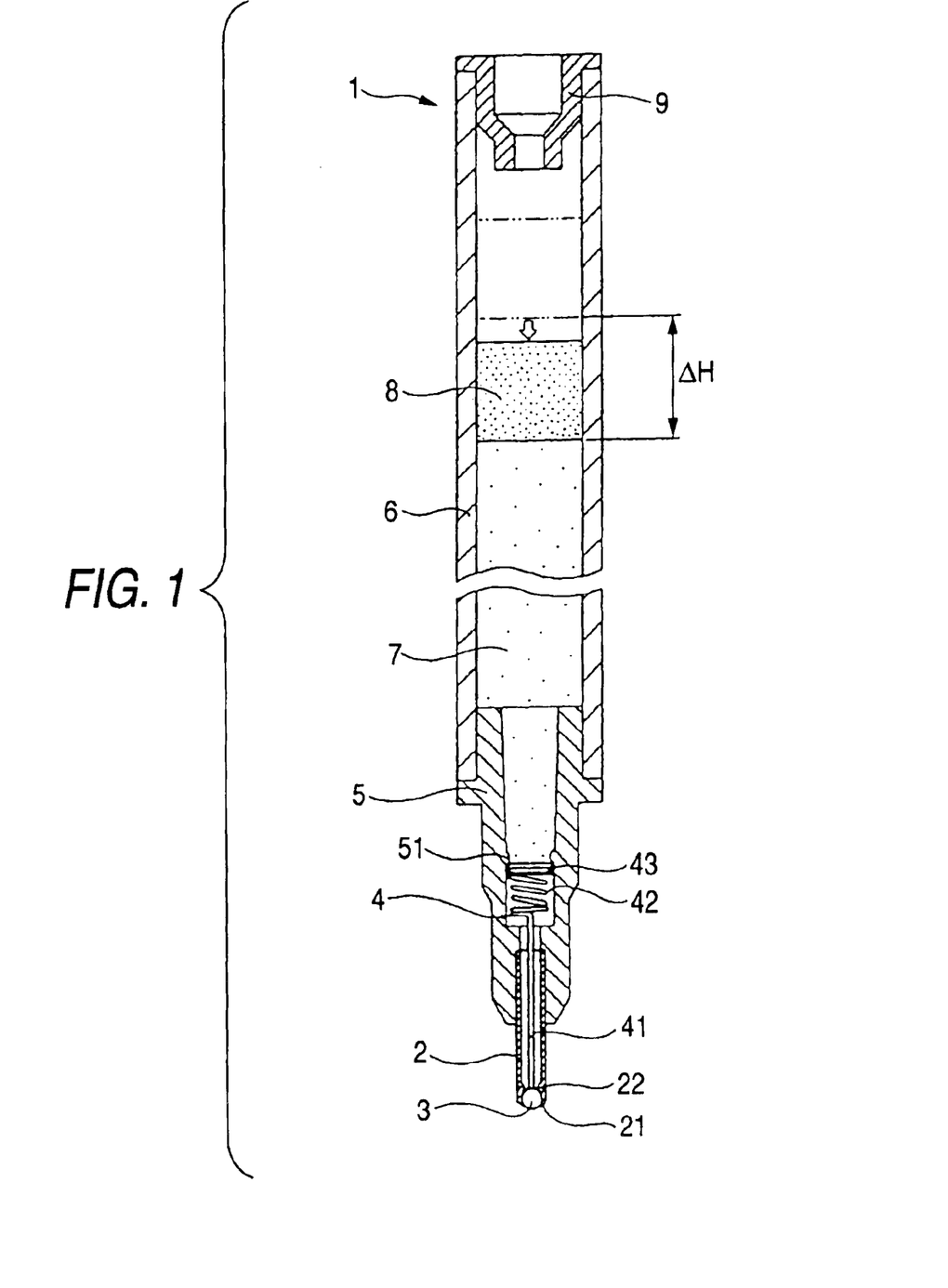
FIG. 1 is a vertical sectional view showing a ball point pen according to a first embodiment of the invention.

In this embodiment, a ball point pen 1 includes a tip body 2 formed so that a ball 3 is rotatably held in a front end portion of the tip body 2, a holder 5 formed so that a rear portion of the tip body 2 is forced and fixed into a front portion of the holder 5, an ink tube 6 formed so that a rear portion of the holder 5 is forced and fixed into a front end opening portion of the ink tube 6, ink 7 reserved in the ink tube 6, an ink follower 8 disposed so as to be received in the ink tube 6, an elastic member 4 (spring) disposed in the inside of the tip body 2 and the inside of the holder 5, and a tail plug 9 forced and fixed into a rear end opening portion of the ink tube 6.

The ink tube 6 is shaped like a right circular cylinder having opposite ends opened and is formed by extrusion molding of a synthetic resin. The rear portion of the holder 5 having the tip body 2 is forced and fixed into the front end opening portion of the ink tube 6. On the other hand, the tail plug 9 having an air hole formed to pierce the tail plug 9 is forced and fixed into the rear end opening portion of the ink tube 6. In the invention, the inner diameter of the ink tube 6 is effectively selected to be in a range of from 4 mm to 6 mm. In this embodiment, a tube having an inner diameter of 4.4 mm is used as the ink tube 6.

The inside of the ink tube 6 is charged with the ink 7 and the ink follower 8. The ink 7 is aqueous ink having a viscosity of 3.5 mPa.s at 20° C. in a B type rotational viscometer or aqueous ink having a viscosity of 9 mPa.s at 2° C. at a rotational speed of 100 rpm in an EL type rotational viscometer and a shear-thinning index of 0.97. The ink follower 8 is made of a high-viscosity fluid disposed at the rear end of the ink 7 and advancing with consumption of the ink 7. Alternatively, the ink follower 8 may be made of a combination of a high-viscosity fluid and a solid matter stored in the inside of the high-viscosity fluid or may be made of a solid matter that can slide on the inner wall of the ink tube 6. Dye type ink is preferred to pigment type ink as the ink 7 from the point of view of obtaining moderate abrasion of a ball seat 22. In this embodiment, aqueous dye ink is used as the ink 7.

Figure 2:
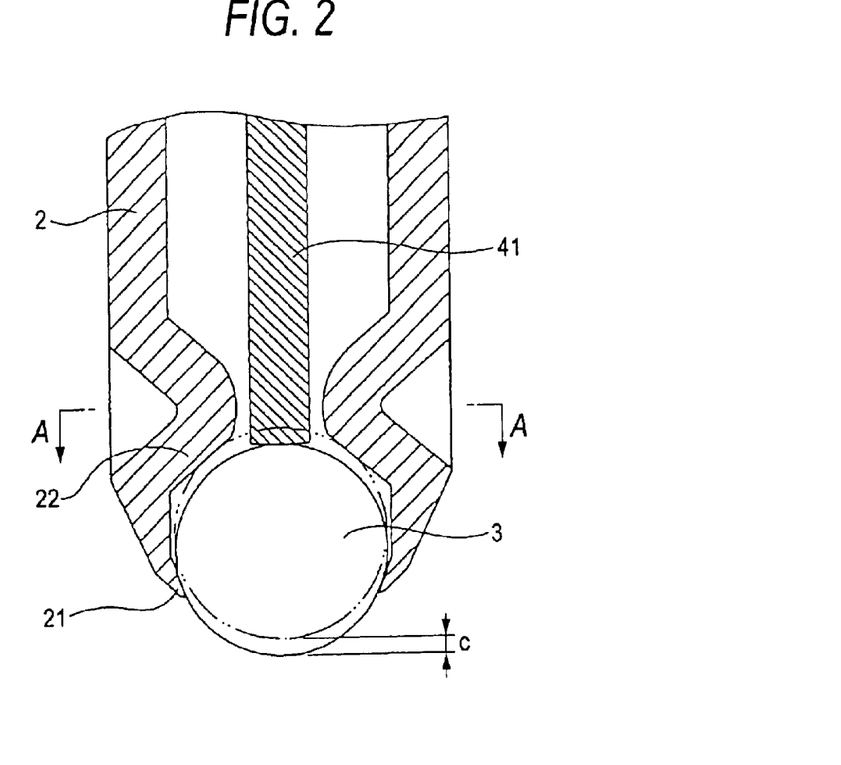
FIG. 2 is an enlarged vertical sectional view showing a front end of a tip body in the ball point pen depicted in FIG. 1.
Figure 3:
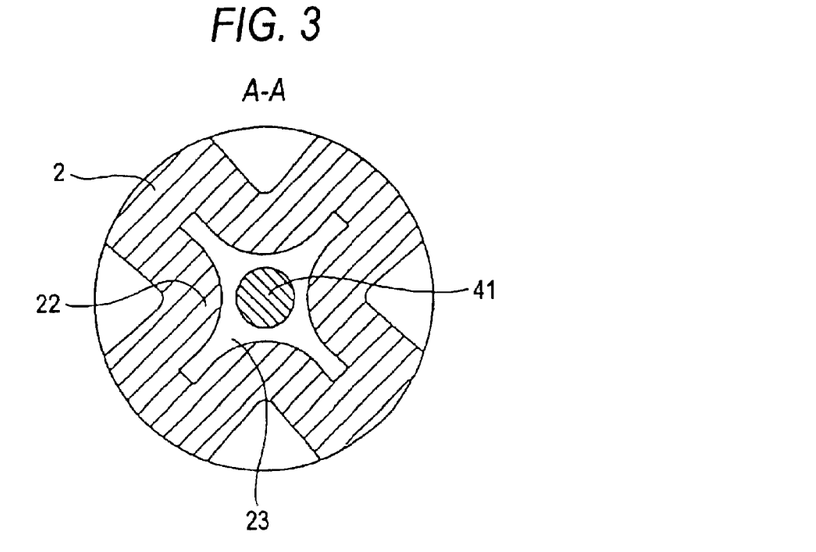
FIG. 3 is an enlarged sectional view taken along the line A—A in FIG. 2.

The tip body 2 is made of a right circular cylindrical small tube of a metal (e.g., austenitic stainless steel such as SUS304 or SUS321). Four inward protrusions 22 (i.e., ball seat) are formed at regular circumferential intervals on an inner surface near a front end of the tip body 2 by deformation due to inward pressing. An annular inward front end edge portion 21 is formed at a front end portion of the tip body 2 by deformation due to inward pressing. The ball 3 is held in a portion (i.e., ball holding portion) between the inner surface of the front end edge portion 21 and the front surface of the inward protrusions 22 so that the ball 3 can rotate and move back and forth.

In the invention, the outer diameter of the ball 3 is preferably selected to be in a range of from 0.5 mm to 0.7 mm. In this embodiment, a ball having an outer diameter of 0.5 mm and a ball having an outer diameter of 0.7 mm are used. The movable length C by which the ball 3 having an outer diameter of from 0.5 mm to 0.7 mm can move back and forth is preferably selected to be in a range of from 10 $\mu$m to 20 $\mu$m. In the ball 3 having an outer diameter of 0.5 mm, an outflow of ink per 100 m is preferably selected to be in a range of from 95 mg to 135 mg from the point of view of preventing scratchiness and blur in writing. In the ball 3 having an outer diameter of 0.7 mm, an outflow of ink per 100 m is preferably selected to be in a range of from 135 mg to 175 mg from the point of view of preventing scratchiness and blur in writing.

Ink flow gaps 23 are formed between the inward protrusions 22 so as to extend from the center portion outward radially in four directions. A rod portion 41 of the elastic member 4 is inserted into the center side of the ink flow gaps 23. A front end of the rod portion 41 abuts on the rear surface of the ball 3 to thereby urge the ball 3 forward.

The holder 5 is a cylinder obtained by injection molding of a synthetic resin. The holder 5 has a tapered front portion to which the tip body 2 is attached, a collar portion abutting on a front end surface of the ink tube 6, and a rear portion forced into the front end opening portion of the ink tube 6. A tip mount hole having a front end opened to the outside and an ink flow hole having a front end communicating with the tip mount hole and a rear end opened to the outside are provided in the inside of the holder 5. A plurality of lock protrusions 51 (e.g., four lock protrusions 51) disposed so as to be distributed circumferentially are integrally formed on an inner surface of an intermediate portion of the ink flow hole.

The elastic member 4 is made of a stainless steel wire material having a wire diameter of 0.14 mm. The elastic member 4 has a rod portion 41 as a front portion, and a coil portion 42 as a rear portion integrated with the rod portion 41. A swollen portion 43 is formed at a rear end portion of the coil portion 42 so that the outer diameter of the swollen portion 43 is set to be larger than that of the coil portion 42 in front of the swollen portion 43. The swollen portion 43 is formed by such end turning that pieces of the wire material adhere closely to each other. The swollen portion 43 climbs over the lock protrusions 51 on the inner surface of the holder 5 from the rear portion of the holder 5 and is locked by the lock protrusions 51. Although this embodiment has been described on the case where the elastic member 4 has a rod portion 41 and a coil portion 42, the invention may be also applied to the case where the elastic member 4 has only a rod portion 41, that is, the elastic member 41 has no coil portion 42. Although this embodiment has been described on the case where the elastic member 4 is made of a metal, the invention may be also applied to the case where the elastic member 4 is made of another material such as synthetic resin, synthetic rubber or elastomer.

In the ball point pen 1 according to this embodiment, when writing is not made, the ball 3 pressed forward by the rod portion 41 of the elastic member 4 comes into close contact with the inner surface of the front end edge portion 21 to thereby seal the pen point. Accordingly, even in the case where the ball point pen 1 is kept with the pen point down, ink can be prevented from leaking from the pen point. In addition, even in the case where the ball point pen 1 is kept with the pen point up, air can be prevented from entering through the pen point.

The elastic force of the elastic member 4 is preferably selected to be in a range of from 15 g to 45 g (more preferably, in a range of from 25 g to 40 g). In this embodiment, the elastic force of the elastic member 4 is set at 35 g which is a relatively high value. As a result, sealing characteristic between the ball 3 and the inner surface of the front end edge portion 21 is improved. In addition, the force (writing pressure) for pressing the ball 3 backward is weakened by the elastic member 4 to relax the contact force of the ball 3 with the ball seat 22 to thereby suppress the abrasion of the ball seat 22.

(Measurement of Outflow of Ink)

An outflow of ink was measured at intervals of a writing distance of 100 m by a writing tester (writing speed: 4 m/min, writing load: 100 g, writing angle: 70°) in the condition that writing was performed spirally with the ball point pen 1 according to this embodiment. A ball having an outer diameter of 0.5 mm and a ball having an outer diameter of 0.7 mm were used as two kinds of balls 3. In each of the two kinds of balls 3, the amount of ink charged was set at 950 mg. Tables 1 and 2 and FIGS. 4 and 5 show results of the measurement.

Figure 4:
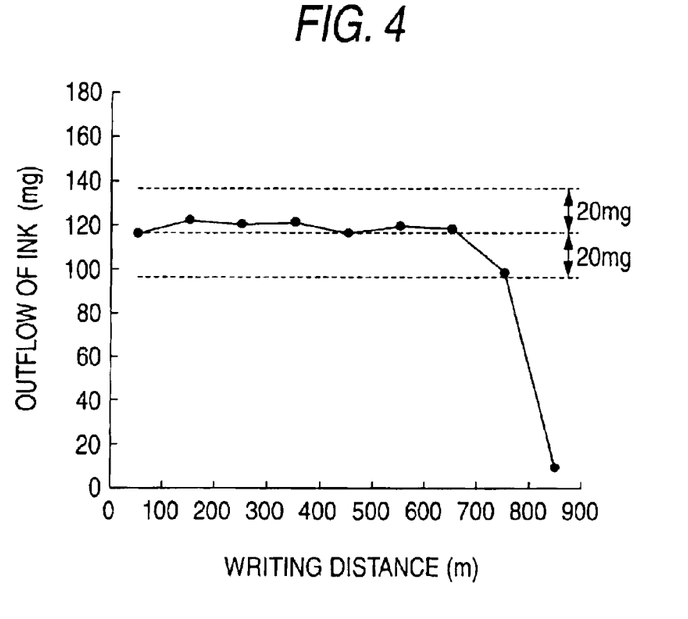
FIG. 4 is a graph showing the relation between writing distance and outflow of ink in the case where a ball having an outer diameter of 0.5 mm is used in the ball point pen depicted in FIG. 1.
Figure 5:
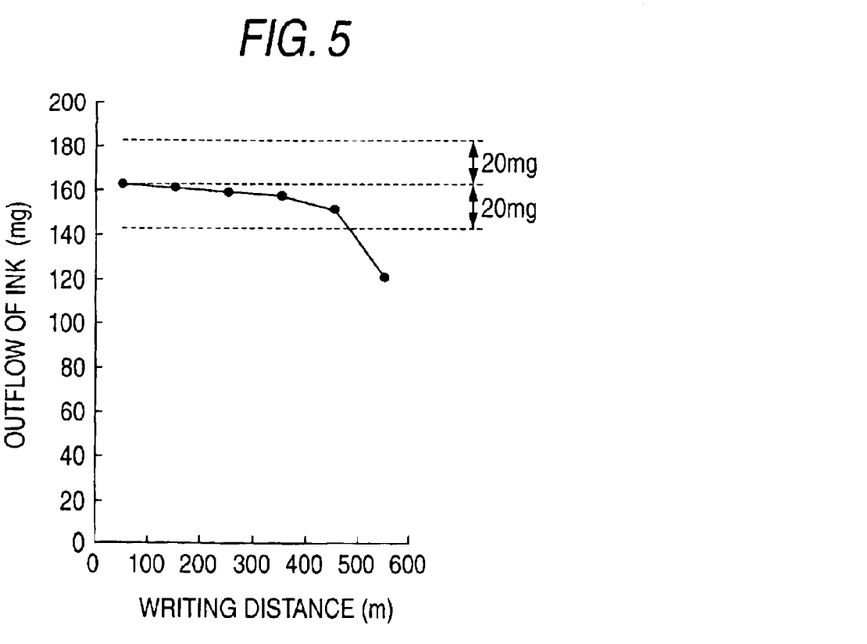
FIG. 5 is a graph showing the relation between writing distance and outflow of ink in the case where a ball having an outer diameter of 0.7 mm is used in the ball point pen depicted in FIG. 1.

(1) Ball with Outer Diameter of 0.5 mm (see Table 1 and FIG. 4)

TABLE 1

| Writing Distance (m) | Outflow of Ink (mg) | Accumulated Outflow of Ink (mg) |
|---|---|---|
| 0–100 | 117 | 117 |
| 100–200 | 123 | 240 |
| 200–300 | 121 | 361 |
| 300–400 | 122 | 483 |
| 400–500 | 117 | 600 |
| 500–600 | 120 | 720 |
| 600–700 | 119 | 839 |
| 700–800 | 99 | 938 |
| 800–900 | 10 | 948 |

Writing Distance at 80% of the Amount of Charged Ink

Because 80% of the amount (950 mg) of charged ink is 760 mg, it is obvious from the accumulated outflow of ink shown in Table 1 that the range of writing distance at a measurement time just before outflow of 80% of the amount of charged ink after the start of writing is from 500 m to 600 m. Accordingly, when an outflow of ink is measured at intervals of a writing distance of 100 m, the range of writing distance until the measurement time just before outflow of 80% of the amount of charged ink from the start of writing is from 0 m to 600 m.

Because 80% of the amount (950 mg) of charged ink is 760 mg, it is obvious from the accumulated outflow of ink shown in Table 1 that the range of writing distance at a measurement time just after outflow of 80% of the amount of charged ink after the start of writing is from 600 m to 700 m. Accordingly, when an outflow of ink is measured at intervals of a writing distance of 100 m, the range of writing distance until the measurement time just after outflow of 80% of the amount of charged ink from the start of writing is from 0 m to 700 m.

Outflow of Ink

A measured value of outflow of ink per writing distance of 100 m in the writing distance range of from 0 m to 600 m is from 117 mg to 123 mg. This value is in a range between a value (97 mg) smaller by 20 mg than the outflow (117 mg) of ink in the writing distance range of from 0 m to 100 m and a value (137 mg) larger by 20 mg than the outflow (117 mg) of ink in the writing distance range of from 0 m to 100 m (see FIG. 4).

A measured value of outflow of ink per writing distance of 100 m in the writing distance range of from 0 m to 700 m is from 117 mg to 123 mg. This value is in a range between a value (97 mg) smaller by 20 mg than the outflow (117 mg) of ink in the writing distance range of from 0 m to 100 m and a value (137 mg) larger by 20 mg than the outflow (117 mg) of ink in the writing distance range of from 0 m to 100 m (see FIG. 4).

Decrement ΔH of Ink Head

The decrement of the head of ink in the writing distance range of from 0 m to 600 m is 45.6 mm so that the decrement ΔH of the ink head per 100 m is 7.6 mm.

The decrement of the ink head in the writing distance range of from 0 m to 700 m is 53.2 mm so that the decrement ΔH of the ink head per 100 m is 7.6 mm.

Increment ΔC of Longitudinal Movable Length C of Ball

The longitudinal movable length C of the ball 3 is 14.5 μm before the start of writing and 15.6 μm just after the writing distance of 600 m. Accordingly, the increment ΔC of the longitudinal movable length C of the ball 3 is 1.1 μm in the writing distance range of from 0 m to 600 m so that the increment ΔC of the longitudinal movable length C of the ball 3 per 100 m is 0.18 μm.

The longitudinal movable length C of the ball 3 is 14.5 μm before the start of writing and 15.8 μm just after the writing distance of 700 m. Accordingly, the increment ΔC of the longitudinal movable length C of the ball 3 is 1.3 μm in the writing distance range of from 0 m to 700 m so that the increment ΔC of the longitudinal movable length C of the ball 3 per 100 m is 0.19 μm.

(2) Ball with Outer Diameter of 0.7 mm (see Table 2 and FIG. 5)

TABLE 2

| Writing Distance (m) | Outflow of Ink (mg) | Accumulated Outflow of Ink (mg) |
|---|---|---|
| 0–100 | 163 | 163 |
| 100–200 | 161 | 324 |
| 200–300 | 159 | 483 |
| 300–400 | 157 | 640 |
| 400–500 | 151 | 791 |
| 500–600 | 120 | 911 |

Writing Distance at 80% of the Amount of Charged Ink

Because 80% of the amount (950 mg) of charged ink is 760 mg, it is obvious from the accumulated outflow of ink shown in Table 2 that the range of writing distance at a measurement time just before outflow of 80% of the amount of charged ink after the start of writing is from 300 m to 400 m. Accordingly, when an outflow of ink is measured at intervals of a writing distance of 100 m, the range of writing distance until the measurement time just before outflow of 80% of the amount of charged ink from the start of writing is from 0 m to 400 m.

Because 80% of the amount (950 mg) of charged ink is 760 mg, it is obvious from the accumulated outflow of ink shown in Table 2 that the range of writing distance at a measurement time just after outflow of 80% of the amount of charged ink after the start of writing is from 400 m to 500 m. Accordingly, when an outflow of ink is measured at intervals of a writing distance of 100 m, the range of writing distance until the measurement time just after outflow of 80% of the amount of charged ink from the start of writing is from 0 m to 500 m.

Outflow of Ink

A measured value of outflow of ink per writing distance of 100 m in the writing distance range of from 0 m to 400 m is from 157 mg to 163 mg. This value is in a range between a value (143 mg) smaller by 20 mg than the outflow (163 mg) of ink in the writing distance range of from 0 m to 100 m and a value (183 mg) larger by 20 mg than the outflow (163 mg) of ink in the writing distance range of from 0 m to 100 m (see FIG. 5).

A measured value of outflow of ink per writing distance of 100 m in the writing distance range of from 0 m to 500 m is from 151 mg to 163 mg. This value is in a range between a value (143 mg) smaller by 20 mg than the outflow (163 mg) of ink in the writing distance range of from 0 m to 100 m and a value (183 mg) larger by 20 mg than the outflow (163 mg) of ink in the writing distance range of from 0 m to 100 m (see FIG. 5).

Decrement ΔH of Ink Head

The decrement ΔH of the ink head in the writing distance range of from 0 m to 400 m is 40.8 mm so that the decrement ΔH of the ink head per 100 m is 10.2 mm.

The decrement ΔH of the ink head in the writing distance range of from 0 m to 500 m is 51.0 mm so that the decrement ΔH of the ink head per 100 m is 10.2 mm.

Increment ΔC of Longitudinal Movable Length C of Ball

The longitudinal movable length C of the ball 3 is 16.9 μm before the start of writing and 18.1 μm just after the writing distance of 400 m. Accordingly, the increment ΔC of the longitudinal movable length C of the ball 3 is 1.2 μm in the writing distance range of from 0 m to 400 m so that the increment ΔC of the longitudinal movable length C of the ball 3 per 100 m is 0.3 μm.

The longitudinal movable length C of the ball 3 is 16.9 μm before the start of writing and 18.4 μm just after the writing distance of 500 m. Accordingly, the increment ΔC of the longitudinal movable length C of the ball 3 is 1.5 μm in the writing distance range of from 0 m to 500 m so that the increment ΔC of the longitudinal movable length C of the ball 3 per 100 m is 0.3 μm.

FIG. 6 to FIG. 10 show a second embodiment of the invention.

Figure 6:
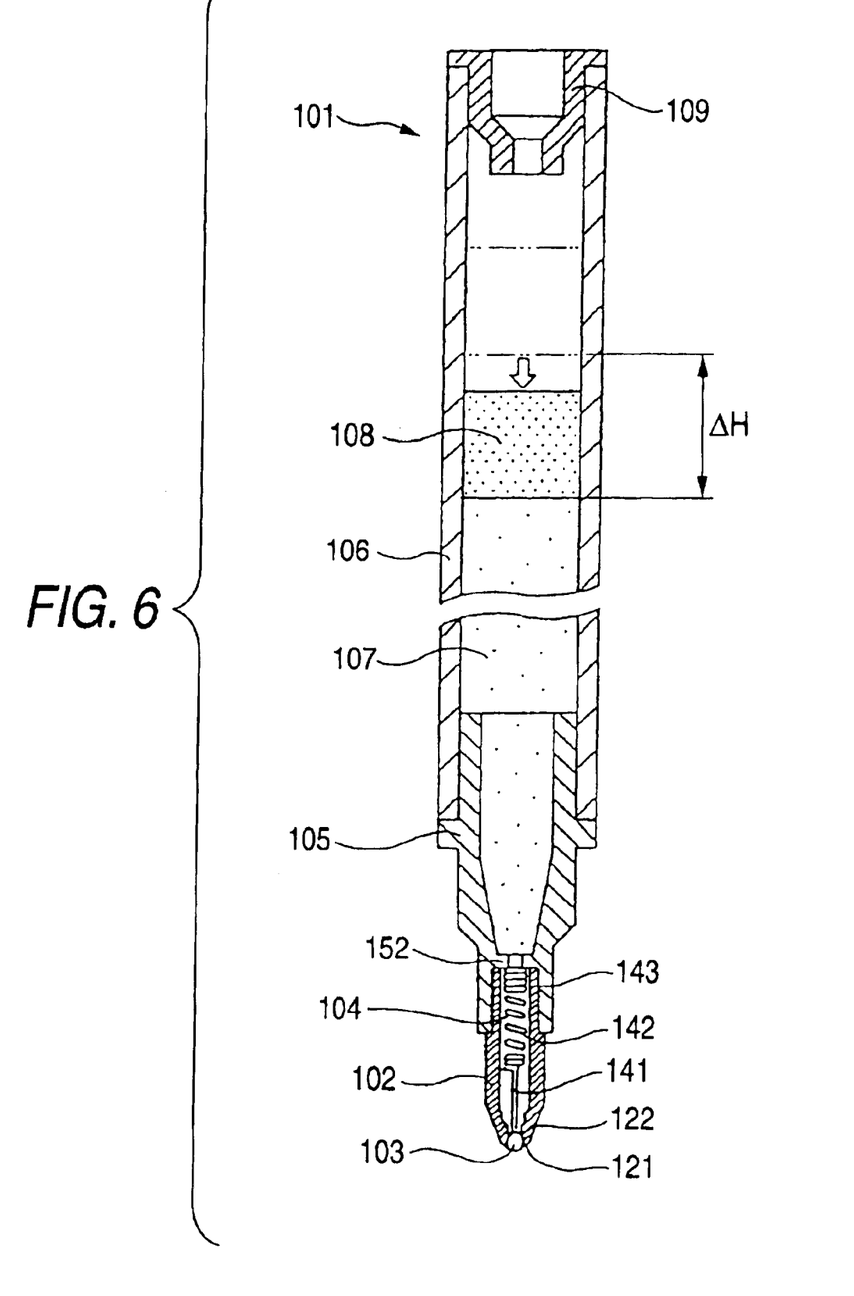
FIG. 6 is a vertical sectional view showing a ball point pen according to a second embodiment of the invention.

In this embodiment, a ball point pen 1 includes a tip body 102 formed so that a ball 103 is rotatably held in a front end portion of the tip body 102, a holder 105 formed so that a rear portion of the tip body 102 is forced and fixed into a front portion of the holder 105, an ink tube 106 formed so that a rear portion of the holder 105 is forced and fixed into a front end opening portion of the ink tube 106, ink 107 reserved in the ink tube 106, an ink follower 108 disposed in the ink tube 106, an elastic member 104 (spring) disposed to be received in the inside of the tip body 102 and the inside of the holder 105, and a tail plug 109 forced and fixed into a rear end opening portion of the ink tube 106.

The ink tube 106 is shaped like a right circular cylinder having opposite ends opened and is formed by extrusion molding of a synthetic resin. The rear portion of the holder 105 having the tip body 102 is forced and fixed into the front end opening portion of the ink tube 106. On the other hand, the tail plug 109 having an air hole formed to pierce the tail plug 109 is forced and fixed into the rear end opening portion of the ink tube 106. In the invention, the inner diameter of the ink tube 106 is effectively selected to be in a range of from 4 mm to 6 mm. In this embodiment, a tube having an inner diameter of 4.4 mm is used as the ink tube 106.

The inside of the ink tube 106 is charged with the ink 107 and the ink follower 108. The ink 107 is aqueous ink having a viscosity of 9 mPa.s at 20° C. in a B type rotational viscometer or aqueous ink having a viscosity of 5 mPa.s at 20° C. at a rotational speed of 100 rpm in an EL type rotational viscometer and a shear-thinning index of 0.97. The ink follower 108 is made of a high-viscosity fluid disposed at the rear end of the ink 107 and advancing with consumption of the ink 107. Alternatively, the ink follower 108 may be made of a combination of a high-viscosity fluid and a solid matter stored in the inside of the high-viscosity fluid or may be made of a solid matter that can slide on the inner wall of the ink tube 106. Dye type ink is preferred to pigment type ink as the ink 107 from the point of view of obtaining moderate abrasion of a ball seat 122. In this embodiment, aqueous dye ink is used as the ink 107.

Figure 7:
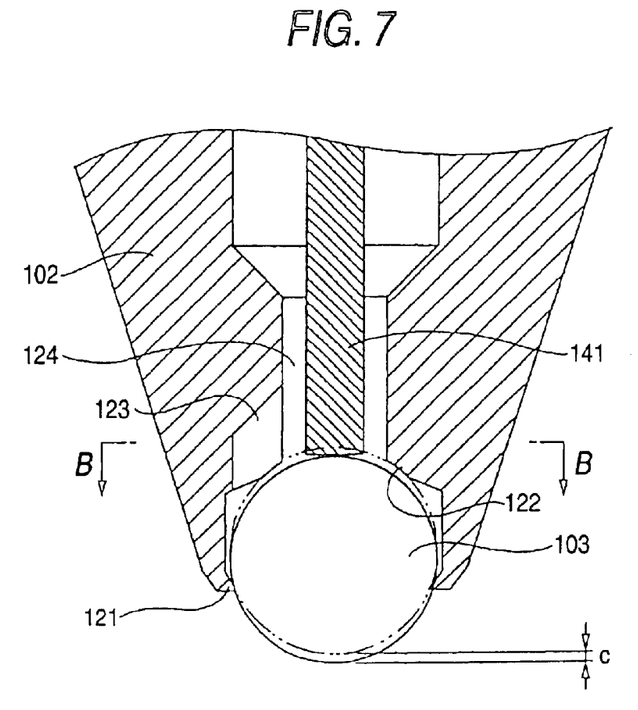
FIG. 7 is an enlarged vertical sectional view showing a front end of a tip body in the ball point pen depicted in FIG. 6.
Figure 8:
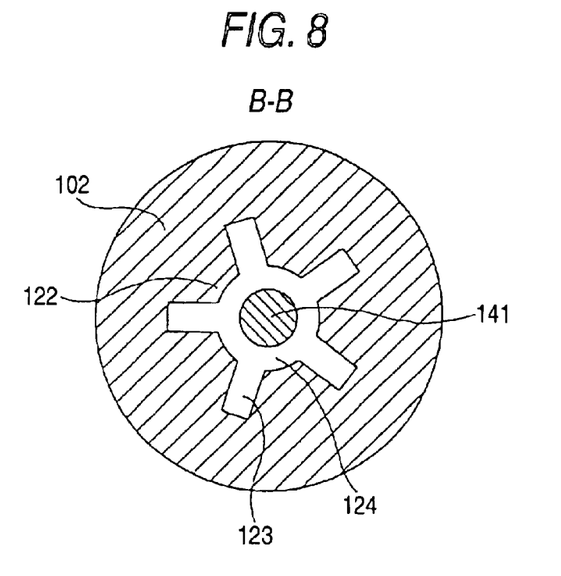
FIG. 8 is an enlarged sectional view taken along the line B—B in FIG. 7.

The tip body 102 has a ball holding hole and a ball seat 122 formed at a front end portion by cutting a metal material (e.g., stainless steel). A center hole 124 is formed in the ball seat 122 so as to pierce the ball seat 122. Ink flow gaps 123 are radially formed in the ball seat 122 so as to communicate with the center hole 124. An annular inward front end edge portion 121 is formed at a front end portion of the tip body 102 by deformation due to inward pressing. The ball 103 is held in a portion (i.e., ball holding portion) between the inner surface of the front end edge portion 21 and the front surface of the ball seat 122 so that the ball 103 can rotate and move back and forth.

In the invention, the outer diameter of the ball 103 is preferably selected to be in a range of from 0.5 mm to 0.7 mm. In this embodiment, a ball having an outer diameter of 0.5 mm and a ball having an outer diameter of 0.7 mm are used. The movable length C by which the ball 103 having an outer diameter of from 0.5 mm to 0.7 mm can move back and forth is preferably selected to be in a range of from 10 μm to 30 μm. In the ball 103 having an outer diameter of 0.5 mm, an outflow of ink per 100 m is preferably selected to be in a range of from 95 mg to 135 mg from the point of view of preventing scratchiness and blur in writing. In the ball 103 having an outer diameter of 0.7 mm, an out flow of ink per 100 m is preferably selected to be in a range of from 135 mg to 175 mg from the point of view of preventing scratchiness and blur in writing.

A rod portion 141 of the elastic member 104 is inserted into the center hole 124. A front end of the rod portion 141 abuts on the rear surface of the ball 103 to thereby urge the ball 103 forward.

The holder 105 is a cylinder obtained by injection molding of a synthetic resin. The holder 105 has a tapered front portion to which the tip body 102 is attached, a collar portion abutting on a front end surface of the ink tube 106, and a rear portion forced into the front end opening portion of the ink tube 106. A tip mount hole having a front end opened to the out side and an ink flow hole having a front end communicating with the tip mount hole and a rear end opened to the outside are provided in the inside of the holder 105. A lock wall portion 152 is integrally formed between the tip mount hole and the ink flow hole so that the rear end of the elastic member 104 abuts on the lock wall portion 152.

The elastic member 104 is made of a stainless steel wire material having a diameter of 0.14 mm. The elastic member 104 has a rod portion 141 as a front portion, and a coil portion 142 as a rear portion integrated with the rod portion 141. A swollen portion 143 is formed at a rear end portion of the coil portion 142 so that the outer diameter of the swollen portion 143 is set to be larger than that of the coil portion 142 in front of the swollen portion 143. The swollen portion 143 is formed by such end turning that pieces of the wire material adhere closely to each other. The swollen portion 143 is locked by the lock wall portion 152. Although this embodiment has been described on the case where the elastic member 104 has a rod portion 141 and a coil portion 142, the invention may be also applied to the case where the elastic member 104 has only a rod portion 141, that is, the elastic member 141 has no coil portion 142. Although this embodiment has been described on the case where the elastic member 104 is made of a metal, the invention may be also applied to the case where the elastic member 104 is made of another material such as synthetic resin, synthetic rubber or elastomer.

In the ball point pen 101 according to this embodiment, when writing is not made, the ball 103 pressed forward by the rod portion 141 of the elastic member 104 comes into close contact with the inner surface of the front end edge portion 121 to thereby seal the pen point. Accordingly, even in the case where the ball point pen 101 is kept with the pen point down, ink can be prevented from leaking from the pen point. In addition, even in the case where the ball point pen 101 is kept with the pen point up, air can be prevented from entering through the pen point.

The elastic force of the elastic member 104 is preferably selected to be in a range of from 15 g to 45 g (more preferably in a range of from 25 g to 40 g). In this embodiment, the elastic force of the elastic member 104 is set at 35 g which is a relatively high value. As a result, sealing characteristic between the ball 103 and the inner surface of the front end edge portion 121 is improved. In addition, the force (writing pressure) for pressing the ball 103 backward is weakened by the elastic member 104 to relax the contact force of the ball 103 with the ball seat 122 to thereby suppress the abrasion of the ball seat 122.

(Measurement of Outflow of Ink)

An outflow of ink was measured at intervals of a writing distance of 100 m by a writing tester (writing speed: 4 m/min, writing load: 100 g, writing angle: 70°) in the condition that writing was performed spirally with the ball point pen 101 according to this embodiment. A ball having an outer diameter of 0.5 mm and a ball having an outer diameter of 0.7 mm were used as two kinds of balls 103. In each of the two kinds of balls 103, the amount of ink charged was set at 950 mg. Tables 3 and 4 and FIG. 9 and FIG. 10 show results of the measurement.

Figure 9:
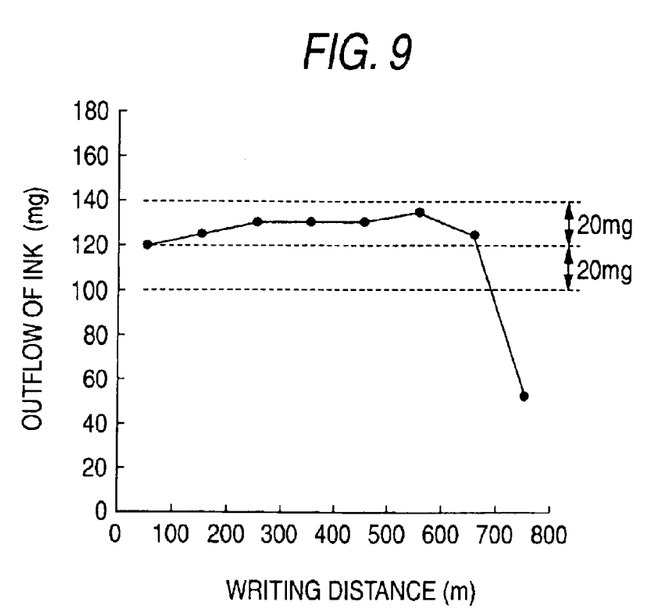
FIG. 9 is a graph showing the relation between writing distance and outflow of ink in the case where a ball having an outer diameter of 0.5 mm is used in the ball point pen depicted in FIG. 6.
Figure 10:
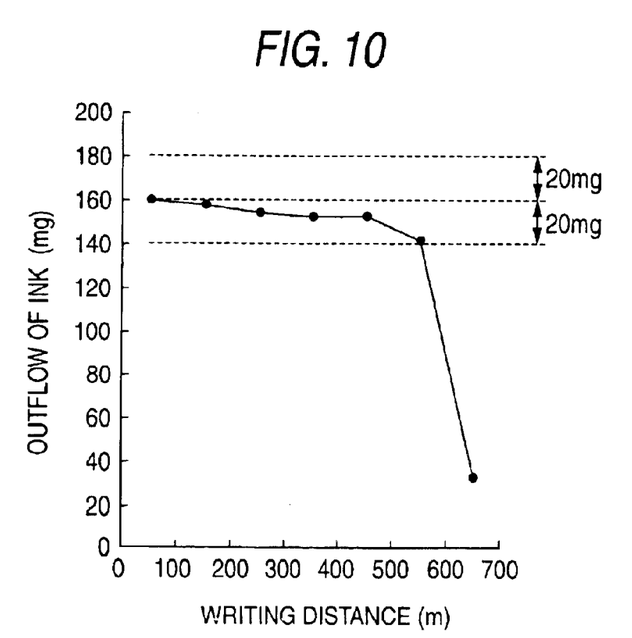
FIG. 10 is a graph showing the relation between writing distance and outflow of ink in the case where a ball having an outer diameter of 0.7 mm is used in the ball point pen depicted in FIG. 6.

(3) Ball with Outer Diameter of 0.5 mm (see Table 3 and FIG. 9)

TABLE 3

| Writing Distance (m) | Outflow of Ink (mg) | Accumulated Outflow of Ink (mg) |
|---|---|---|
| 0–100 | 118 | 118 |
| 100–200 | 123 | 241 |
| 200–300 | 128 | 369 |
| 300–400 | 128 | 497 |
| 400–500 | 128 | 625 |
| 500–600 | 132 | 757 |
| 600–700 | 122 | 879 |
| 700–800 | 50 | 929 |

Writing Distance at 80% of the Amount of Charged Ink

Because 80% of the amount (950 mg) of charged ink is 760 mg, it is obvious from the accumulated outflow of ink shown in Table 3 that the range of writing distance at a measurement time just before outflow of 80% of the amount of charged ink after the start of writing is from 500 m to 600 m. Accordingly, when an outflow of ink is measured at intervals of a writing distance of 100 m, the range of writing distance until the measurement time just before outflow of 80% of the amount of charged ink from the start of writing is from 0 m to 600 m.

Because 80% of the amount (950 mg) of charged ink is 760 mg, it is obvious from the accumulated outflow of ink shown in Table 3 that the range of writing distance at a measurement time just after outflow of 80% of the amount of charged ink after the start of writing is from 600 m to 700 m. Accordingly, when an outflow of ink is measured at intervals of a writing distance of 100 m, the range of writing distance until the measurement time just after outflow of 80% of the amount of charged ink from the start of writing is from 0 m to 700 m.

Outflow of Ink

A measured value of outflow of ink per writing distance of 100 m in the writing distance range of from 0 m to 600 m is from 118 mg to 132 mg. This value is in a range between a value (98 mg) smaller by 20 mg than the outflow (118 mg) of ink in the writing distance range of from 0 m to 100 m and a value (138 mg) larger by 20 mg than the outflow (118 mg) of ink in the writing distance range of from 0 m to 100 m (see FIG. 9).

A measured value of outflow of ink per writing distance of 100 m in the writing distance range of from 0 m to 700 m is from 118 mg to 132 mg. This value is in a range between a value (98 mg) smaller by 20 mg than the outflow (118 mg) of ink in the writing distance range of from 0 m to 100 m and a value (138 mg) larger by 20 mg than the outflow (118 mg) of ink in the writing distance range of from 0 m to 100 m (see FIG. 9).

Decrement ΔH of Ink Head

The decrement of the head of ink in the writing distance range of from 0 m to 600 m is 47.0 mm so that the decrement ΔH of the ink head per 100 m is 7.8 mm.

The decrement of the ink head in the writing distance range of from 0 m to 700 m is 54.5 mm so that the decrement ΔH of the ink head per 100 m is 7.8 mm.

Increment ΔC of Longitudinal Movable Length C of Ball

The longitudinal movable length C of the ball 103 is 20.0 μm before the start of writing and 23.0 μm just after the writing distance of 600 m. Accordingly, the increment ΔC of the longitudinal movable length C of the ball 103 is 3.0 μm in the writing distance range of from 0 m to 600 m so that the increment ΔC of the longitudinal movable length C of the ball 103 per 100 m is 0.5 μm.

The longitudinal movable length C of the ball 103 is 20.0 μm before the start of writing and 24.0 μm just after the writing distance of 700 m. Accordingly, the increment ΔC of the longitudinal movable length C of the ball 103 is 4.0 μm in the writing distance range of from 0 m to 700 m so that the increment ΔC of the longitudinal movable length C of the ball 103 per 100 m is 0.57 μm.

(4) Ball with Outer Diameter of 0.7 mm (see Table 4 and FIG. 10)

TABLE 4

| Writing Distance (m) | Outflow of Ink (mg) | Accumulated Outflow of Ink (mg) |
|---|---|---|
| 0–100 | 159 | 159 |
| 100–200 | 157 | 316 |
| 200–300 | 153 | 469 |
| 300–400 | 151 | 620 |
| 400–500 | 151 | 771 |
| 500–600 | 140 | 911 |
| 600–700 | 32 | 943 |

Writing Distance at 80% of the Amount of Charged Ink

Because 80% of the amount (950 mg) of charged ink is 760 mg, it is obvious from the accumulated outflow of ink shown in Table 4 that the range of writing distance at a measurement time just before outflow of 80% of the amount of charged ink after the start of writing is from 300 m to 400 m. Accordingly, when an outflow of ink is measured at intervals of a writing distance of 100 m, the range of writing distance until the measurement time just before outflow of 80% of the amount of charged ink from the start of writing is from 0 m to 400 m.

Because 80% of the amount (950 mg) of charged ink is 760 mg, it is obvious from the accumulated outflow of ink shown in Table 4 that the range of writing distance at a measurement time just after outflow of 80% of the amount of charged ink after the start of writing is from 400 m to 500 m. Accordingly, when an outflow of ink is measured at intervals of a writing distance of 100 m, the range of writing distance until the measurement time just after outflow of 80% of the amount of charged ink from the start of writing is from 0 m to 500 m.

Outflow of Ink

A measured value of outflow of ink per writing distance of 100 m in the writing distance range of from 0 m to 400 m is from 151 mg to 159 mg. This value is in a range between a value (139 mg) smaller by 20 mg than the outflow (159 mg) of ink in the writing distance range of from 0 m to 100 m and a value (179 mg) larger by 20 mg than the outflow (159 mg) of ink in the writing distance range of from 0 m to 100 m (see FIG. 10).

A measured value of outflow of ink per writing distance of 100 m in the writing distance range of from 0 m to 500 m is from 151 mg to 159 mg. This value is in a range between a value (139 mg) smaller by 20 mg than the outflow (159 mg) of ink in the writing distance range of from 0 m to 100 m and a value (179 mg) larger by 20 mg than the outflow (159 mg) of ink in the writing distance range of from 0 m to 100 m (see FIG. 10).

Decrement ΔH of Ink Head

The decrement ΔH of the ink head in the writing distance range of from 0 m to 400 m is 38.5 mm so that the decrement ΔH of the ink head per 100 m is 9.6 mm.

The decrement ΔH of the ink head in the writing distance range of from 0 m to 500 m is 47.8 mm so that the decrement ΔH of the ink head per 100 m is 9.6 mm.

Increment ΔC of Longitudinal Movable Length C of Ball

The longitudinal movable length C of the ball 103 is 25.0 μm before the start of writing and 26.0 μm just after the writing distance of 400 m. Accordingly, the increment ΔC of the longitudinal movable length C of the ball 103 is 1.0 μm in the writing distance range of from 0 m to 400 m so that the increment ΔC of the longitudinal movable length C of the ball 103 per 100 m is 0.25 μm.

The longitudinal movable length C of the ball 103 is 25.0 μm before the start of writing and 26.5 μm just after the writing distance of 500 m. Accordingly, the increment ΔC of the longitudinal movable length C of the ball 103 is 1.5 μm in the writing distance range of from 0 m to 500 m so that the increment ΔC of the longitudinal movable length C of the ball 103 per 100 m is 0.3 μm.

According to the invention, the outflow of ink until almost consumption of charged ink after the start of writing can be kept in a proper range to thereby suppress occurrence of scratchiness and blur in writing.

Moreover, occurrence of scratchiness and blur in writing can be surely prevented until almost of charged ink is consumed after the start of writing.

Moreover, the outflow of ink can be more surely kept in a proper range until almost of charged ink is consumed after the start of writing, so that occurrence of scratchiness and blur in writing can be prevented.

Moreover, ink follow-up characteristic is improved so that smooth writing can be made without scratchiness in writing even in the case where writing is made at a high speed.

Moreover, ink follow-up characteristic is improved so that smooth writing can be made without scratchiness in writing even in the case where writing is made at a high speed.

What is claimed is:

1. A ball point pen comprising:

a tip body including a front end edge portion, a ball seat provided inward at a front end, and a ball rotatably held in said front end edge portion and said ball seat;

an ink tube formed to provide said tip body at a front end thereof;

ink reserved in said ink tube;

an ink follower disposed at a rear end of said ink and advancing with consumption of said ink, and an elastic member urging said ball forward to bring said ball into contact with an inner surface of said front end edge portion of said tip body, wherein the value of outflow of ink per writing distance of 100 m, until a measurement time just before outflow of 80% of the amount of charged ink from the start of writing in the case where an outflow of ink is measured at intervals of a writing distance of 100 m, is in a range between a value smaller by 20 mg than the outflow of ink in the writing distance range of from 0 m to 100 m and a value larger by 20 mg than the outflow of ink in the writing distance range of from 0 m to 100 m.

2. A ball point pen according to claim 1, wherein the decrement of the head of ink per writing distance of 100 m, until a measurement time just before outflow of 80% of the amount of charged ink from the start of writing in the case where an outflow of ink is measured at intervals of a writing distance of 100 m, is in a range of from 3 mm to 12 mm.

3. A ball point pen according to claim 2, wherein the increment of longitudinal movable length of said ball at a front end of said tip body per writing distance of 100 m, until a measurement time just before outflow of 80% of the amount of charged ink from the start of writing in the case where an outflow of ink is measured at intervals of a writing distance of 100 m, is in a range of from 0.1 μm to 1.5 μm.

4. A ball point pen according to claim 1, wherein the viscosity of said ink at 20° C. is in a range of from 1 mPa.s to 50 mPa.s.

5. A ball point pen according to claim 1, wherein the viscosity of said ink measured at 20° C. at a rotational speed of 100 rpm by an E-type rotational viscometer is in a range of from 3 mPa.s to 160 mPa.s, and the shear-thinning index of said ink is in a range of from 0.80 to 0.99.

6. A ball point pen according to claim 1, wherein the tip body is made of a right circular cylindrical small tube of a metal, and plural inward protrusions are formed at regular circumferential intervals on an inner surface near a front end of the tip body by deformation due to inward pressing.

7. A ball point pen according to claim 1, wherein the tip body has a ball holding hole and a ball seat formed at a front end portion by cutting a metal material.

* * * * *

UNITED STATES PATENT AND TRADEMARK OFFICE
CERTIFICATE OF CORRECTION

PATENT NO. : 6,805,511 B2
DATED : October 19, 2004
INVENTOR(S) : Masashi Ando It is certified that error appears in the above-identified patent and that said Letters Patent is hereby corrected as shown below:

<u>Title page,</u>
Item [30], Foreign Application Priorty Data, should be:
-- October 22, 2002 (JP) P2002-307180 --

Signed and Sealed this

Twenty-second Day of February, 2005

JON W. DUDAS
*Director of the United States Patent and Trademark Office*